(12) United States Patent
Gosselin et al.

(10) Patent No.: US 6,574,236 B1
(45) Date of Patent: Jun. 3, 2003

(54) INTERFACE DEVICE HAVING VDSL SPLITTER AND INTERFERENCE FILTER

(75) Inventors: Linda K. Gosselin, Bailey, CO (US); Tom T. Thompson, Morrison, CO (US); Richard H. Fink, Aurora, CO (US)

(73) Assignee: Qwest Communications International Inc., Denver, CO (US)

(*) Notice: Subject to any disclaimer, the term of this patent is extended or adjusted under 35 U.S.C. 154(b) by 0 days.

(21) Appl. No.: 09/314,467

(22) Filed: May 18, 1999

(51) Int. Cl.[7] .......................... H04J 3/16; H04M 11/00; H04N 7/173
(52) U.S. Cl. .................. 370/465; 370/488; 379/93.08; 725/127
(58) Field of Search ................................ 370/463, 455, 370/481, 488–497, 480; 375/285, 288, 296; 379/90.01, 93.01–93.09, 93.14, 93.21, 93.28, 93.33, 110.01, 156, 173.1, 387; 725/149, 144, 106, 109, 117, 124, 125, 127; 333/32–33

(56) References Cited

U.S. PATENT DOCUMENTS

| | | | | |
|---|---|---|---|---|
| 4,003,005 A | * | 1/1977 | Mukherjee et al. | 333/32 |
| 5,930,340 A | * | 7/1999 | Bell | 379/93.08 |
| 6,005,865 A | | 12/1999 | Lewis et al. | |
| 6,144,659 A | * | 11/2000 | Nye et al. | 370/493 |
| 6,208,637 B1 | * | 3/2001 | Eames | 370/352 |
| 6,272,219 B1 | * | 8/2001 | De Bruycker et al. | 370/493 |
| 6,314,102 B1 | * | 11/2001 | Czerwiec et al. | 370/493 |
| 6,430,199 B1 | * | 8/2002 | Kerpez | 370/493 |

\* cited by examiner

Primary Examiner—Steven Nguyen
(74) Attorney, Agent, or Firm—Brooks & Kushman P.C.

(57) ABSTRACT

A customer interface device for coupling a customer site to a VDSL-based video, voice and data distribution network includes a signal splitter for separating incoming narrowband and broadband from a single twisted-pair copper wire, a narrowband port for connection to existing telephone wiring at the customer site, and a broadband port for connection to a customer set-top box via a CAT 5 wire. The interface device further includes a high pass filter connected between the splitter and the narrowband port, and a low pass filter connected between the splitter and the broadband port. The filters improve broadband signal quality while preventing feedback of EMI noise from the existing building wiring to the network.

11 Claims, 2 Drawing Sheets

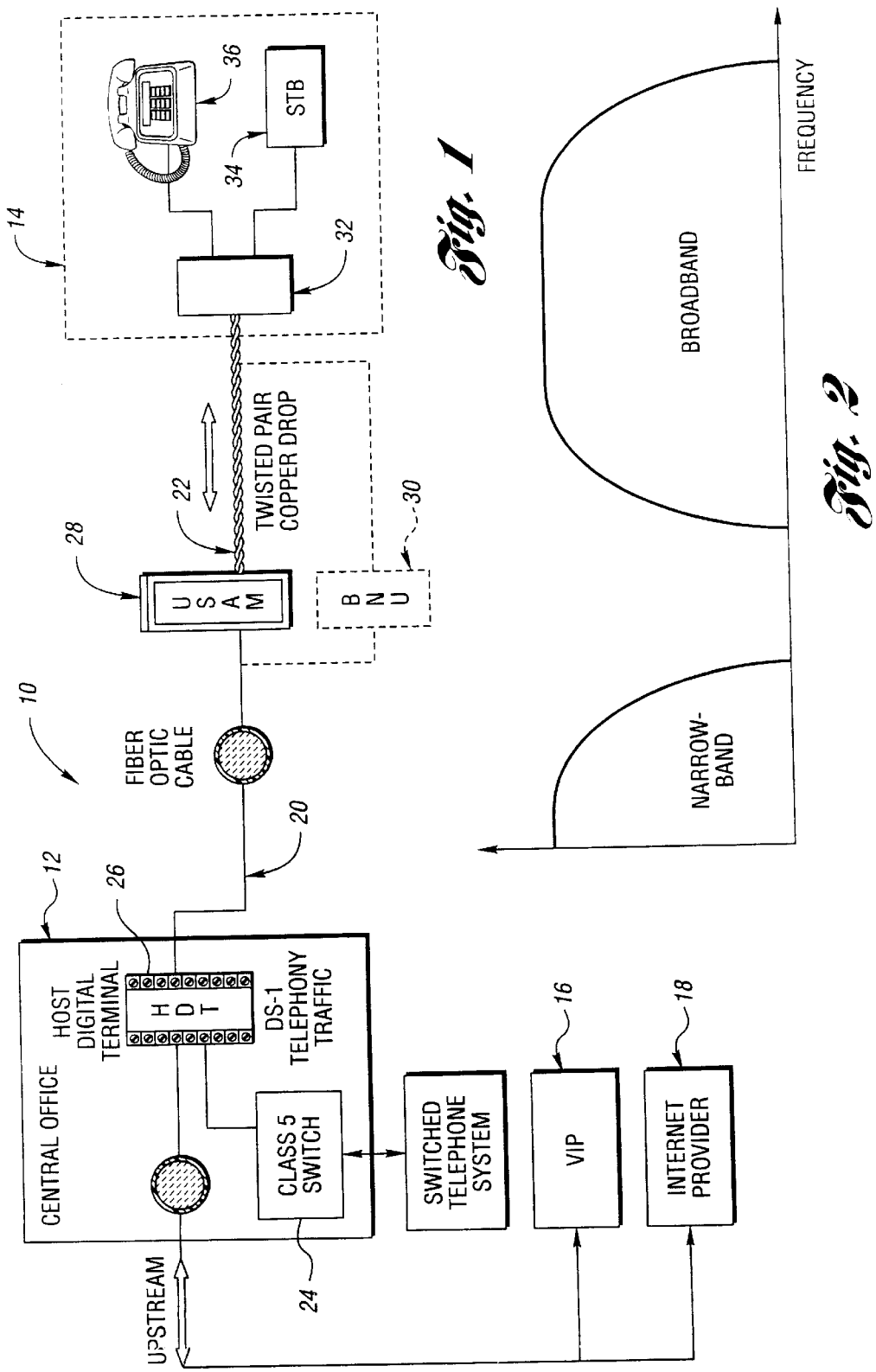

INTERFACE DEVICE HAVING VDSL SPLITTER AND INTERFERENCE FILTER

TECHNICAL FIELD

The present invention generally relates to broadband and VDSL based communication networks having combined broadband and narrowband services, and more particularly to customer interface device capable of allowing a single twisted-pair copper cable to support both narrow and broadband services.

BACKGROUND ART

VDSL (Very high speed Digital Subscriber Line) is a packet-based transmission architecture used to provide extremely high bandwidth distribution of digital video and data signals to customer buildings. A VDSL-based architecture can advantageously provide a single platform for supporting bandwidth-intensive applications, such as Internet access, remote LAN access, video conferencing, and video-on-demand.

VDSL services are typically implemented in an asymmetric form having a downstream transmission capability of about 52 Mbps over twisted pair copper wire arranged in local loops of 300 m, 26 Mbps at 1,000 m, and 13 Mbps at 1,500 m. Upstream data rates in asymmetric implementations tend to range from about 1.6 Mbps to about 2.3 Mbps. A typical distribution network includes a central office equipped with a host digital terminal (HDT) and arranged to operate as hub between multiple video information providers (VIPs) and digital service providers (DSPs) and customer residential dwellings. In a fiber-to-the-neighborhood (FTTN) type distribution network, optic fiber (e.g. OC-3c and OC-12c) lines are used to connect the central office to a universal system access multiplexer (USAM), which is then connected to a network interface device (NID) located on the customer property via twisted pair copper wire. A dedicated VDSL loop extends between the NID and an individual customer residence using an existing POTS or telephone system twisted pair wire, and a customer interface device, such as a residential gateway or set top box, provides a connection point for a customer television or personal computer. A fiber-to-the-curb (FTTC) type distribution network is similar except that a broadband network unit (BNU) is used in place of the USAM, and coaxial cable is used to connect the BNU, NID, and set top box.

The VDSL signal format is used to carry signals to and from the customer. In these networks, the twisted pair copper wire is used to carry both narrowband and broadband signals. As a consequence, a signal splitter is required to separate the narrowband signals (such as telephone voice signals) and broadband signals for coupling to the existing copper-based wiring plant inside the residence. However, such an arrangement can be problematic in that the physical connection to the existing copper-based wiring plant allows introduction of electromagnetic interference (EMI) and radio interference into the distribution network. Such interference can easily degrade signal quality of the VDSL/broadband signals.

Therefore, a need exists for an economical arrangement which can be used in a VDSL distribution network to allow a single twisted pair wire to support both narrowband and broadband signals to and from a customer location while preventing ingress of unwanted interference into the network.

DISCLOSURE OF INVENTION

Therefore, it is an object of the present invention to provide an interface device which is coupled to a VDSL communication network and is capable of supporting narrowband and broadband signals on a common twisted-pair copper line while minimizing the possibility of noise from feeding back into the VDSL network through the device.

It is another object of the present invention to provide a customer interface device for use in a VDSL communication network which includes a narrowband and broadband signal splitter coupled to a low pass and high pass filter so that a common twisted-pair copper line can carry both narrowband and broadband signals while blocking infiltration of EMI and other noise into the VDSL network.

In accordance with these and other objects, the present invention provides an interface device located at a customer site for connection to a VDSL based communication network providing combined narrowband and broadband signals, where the interface device includes a network port for receiving the combined narrowband and broadband signals from a single twisted-pair copper cable connected to a network device, a narrowband port for connection to a wiring plant located at the customer site, and a broadband port for connection to a twisted-pair copper cable located at the customer site. A frequency splitter is connected to the network port for separating the broadband signals for output at the broadband port and the narrowband signals for output at the narrowband port. A low pass filter is connected between the frequency splitter and the narrowband port for filtering the separated narrowband signals before output at the narrowband port, and a high pass filter is connected between the frequency splitter and the broadband port for filtering the separated broadband signals before output at the broadband port. In addition to improving signal quality, the low pass filter and high pass filter reduce feedback of interference into the network from the wiring plant and the twisted-pair copper cable coupled to the broadband port.

In a preferred embodiment, the broadband port is connected to a Category 5 type twisted-pair copper cable to reduce signal interference with the separated and filtered broadband signals.

In accordance with another aspect of the present invention, a broadband communication network is provided for distributing combined narrowband and broadband signals, wherein the network includes a central office connected to at least one multi-media service provider and to a switched telephone system. The central office comprises narrowband and broadband signal processors for combining the narrowband and broadband signals on a single network distribution line. A network device is connected to the central office for providing a single twisted-pair copper cable drop feed to a customer site. An interface device is located at the customer site for receiving the combined narrowband and broadband signals from the single twisted-pair copper cable drop feed, wherein the interface device includes a frequency splitter for separating the broadband signals and narrowband signals for output on separate wiring plants located at the customer site, a low pass filter connected to the frequency splitter for filtering the separated narrowband signals before output from the interface device, and a high pass filter connected to the frequency splitter for filtering the separated broadband signals before output from the interface device.

The network can be configured as either a FTTC or FTTN type network with the network device comprising a universal service access multiplexer or a broadband network unit. The network is arranged so that the separated and filtered narrowband signals are output from the interface device on a copper pair wire, such as an existing telephone wiring plant at the customer site. The separated and filtered broadband signals are output from the interface device on a Category 5 twisted-pair copper cable.

In accordance with yet another aspect of the present invention, a method is provided for interfacing a customer site to a VDSL based communication network providing combined narrowband and broadband signals on a single distribution line, wherein the method includes receiving the combined narrowband and broadband signals at the customer site from a single twisted-pair copper drop feed, and splitting the narrowband and broadband signals into separate output signals. Then, the separated narrowband signals are low pass filtered, and the separated broadband signals are high pass filtered. The filtered signals are output on separate copper wiring plants located at the customer site for delivery to designated customer devices.

Thus, the present invention advantageously provides an interface device which can support delivery of narrowband and broadband signals on a common twisted-pair cable without compromising signal quality.

The above objects and other objects, features, and advantages of the present invention are readily apparent from the following detailed description of the best mode for carrying out the invention when taken in connection with the accompanying drawings.

BRIEF DESCRIPTION OF DRAWINGS

FIG. 1 is a block diagram of a VDSL-based distribution communication network in accordance with an exemplary embodiment of the present invention;

FIG. 2 is a graph representing combined narrowband and broadband signals spectrums on a single twisted pair copper cable;

BEST MODE FOR CARRYING OUT THE INVENTION

Figure 3:
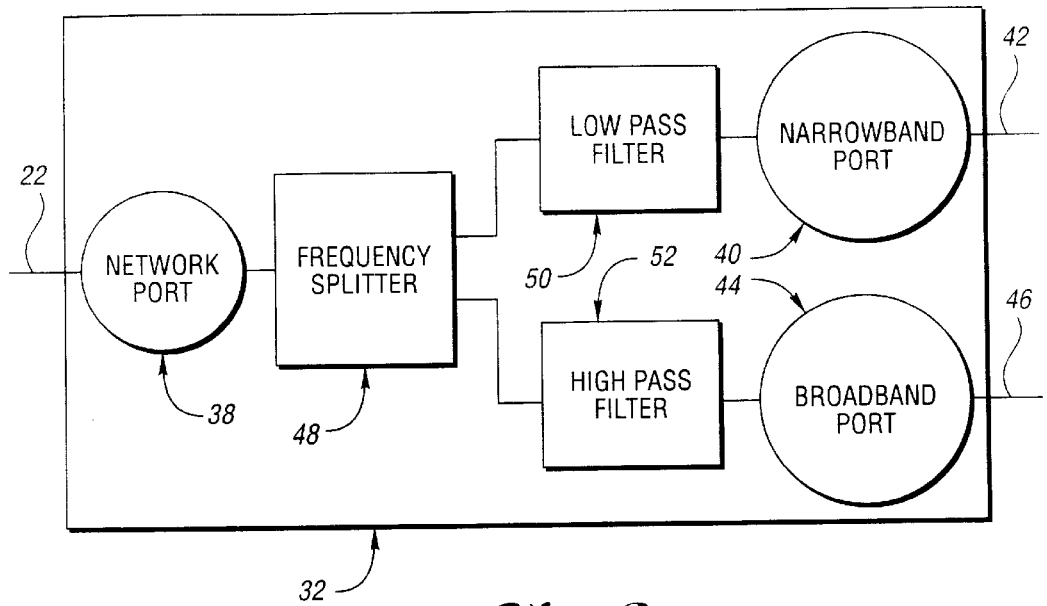
FIG. 3 is a block diagram of the interface device in accordance with the present invention.

Referring to FIG. 1, a VDSL communication network in accordance with an exemplary embodiment of the present invention is generally indicated at 10 and includes a central office 12 connected to one or more outside multi-media type service providers and arranged to operate as a network hub for redistributing signals received from the outside service providers to one or more customer sites 14. For example, video signals are provided from an outside video information provider (VIP) 16, and digital data signals are received from an outside data service provider 18 such as a suitable Internet server. The central office processes the received signals for retransmission by an XDSL transmission unit onto a distribution line formed from a fiber optic cable 20 and a twisted pair copper cable 22. The central office includes a class 5 digital switch 24 for coupling of telephony traffic such as DS-1 service to and from fiber optic cable 20 by way of a host digital terminal (HDT) 26. The central office further includes appropriate MPEG encoder/decoder circuitry and a multiplexer arrangement for supporting transmission of VDSL formatted signals on cable 20, thereby supporting combined narrowband telephony and broadband digital video and data signals on the same distribution line as shown in the graph of FIG. 2.

The combined signals are preferably transmitted using an asynchronous transfer mode (ATM) protocol. Such a protocol requires ATM framing of the signals to include a timing signal used by a receiving unit decoder to decode the signal payload. Examples of suitable fiber optic cable 20 include OC3c or OC12c cable, while twisted-pair cable 22 is preferably implemented using Category (CAT) 5 twisted pair wire.

The central office is coupled to at least one USAM 28 or BNU 30 located near a customer site via cable 20. As noted previously, a USAM is used in a FTTN type network configuration, while a BNU is used in a FTTC type network configuration. More specifically, a USAM is located near the customer site within 4,000 feet (≈1220 m) of a central point of connection service panel mounted in the building. In accordance with the present invention, the service panel includes an interface device 32 as shown and described below in connection with FIG. 3. A BNU is typically located deeper in the network, such as within 150 feet of the customer building. The USAM or BNU are arranged to operate as a single platform for voice, video, and data signals.

As described in more detail below, twisted-pair cable 20 carries the combined voice, data, and video signals to interface device for redistribution over individual distribution wiring located within the building. The interface device is arranged to separate the voice, data and video signals into output signals for use with customer television set-top boxes 34, telephones 36 and personal computers (not shown).

More specifically, as shown on FIG. 3, each interface device 32 includes a housing having at least three connection ports arranged for connection to a set of twisted-pair copper cables. These three ports include a network port 38 for providing a connection to the cable running from the USAM or BNU, a narrowband port 40 for providing a connection to an existing copper-pair telephone wiring plant 42 at the customer site, and a broadband port 44 for providing a connection to a customer set-top box 32. The set-top box can include coaxial and Ethernet ports for output of the broadband video and data signals to a television and personal computer respectively.

The interface device includes a frequency splitter 48 coupled to the network port for separating incoming narrowband and broadband signals from the single twisted-pair copper cable. The frequency splitter can include appropriate signal amplifiers to provide acceptable signal amplitudes at the respective output ports as is well understood in the art. A low pass filter 50 is connected between the splitter and the narrowband port, and operates to filter the narrowband signals when entering the customer site. The low pass filter also advantageously reduces EMI and other radio interference that can feedback into the network from the inside wiring plant. Preventing or reducing such interference lessens the possibility of signal degradation on the network side of the interface device, particularly for the broadband video and data signals.

A high pass filter 52 is connected between the splitter and the broadband port. The high pass filter operates to filter the incoming broadband signal to improve signal quality. In addition, as with the low pass filter, the high pass filter also provides a barrier for preventing feedback of unwanted noise signals from the existing building wiring to the network side of the interface device. Still further, the preferred embodiment uses a CAT 5 cable 46 to carry the filtered broadband signals to the set-top box to further improve signal quality. More specifically, the twisted arrangement of the copper wire pair in the CAT 5 cable inherently prevents the cable from acting as an antenna by canceling out interference which could otherwise feedback into the network or degrade the quality of the signal output to the set-top box.

Figure 4:
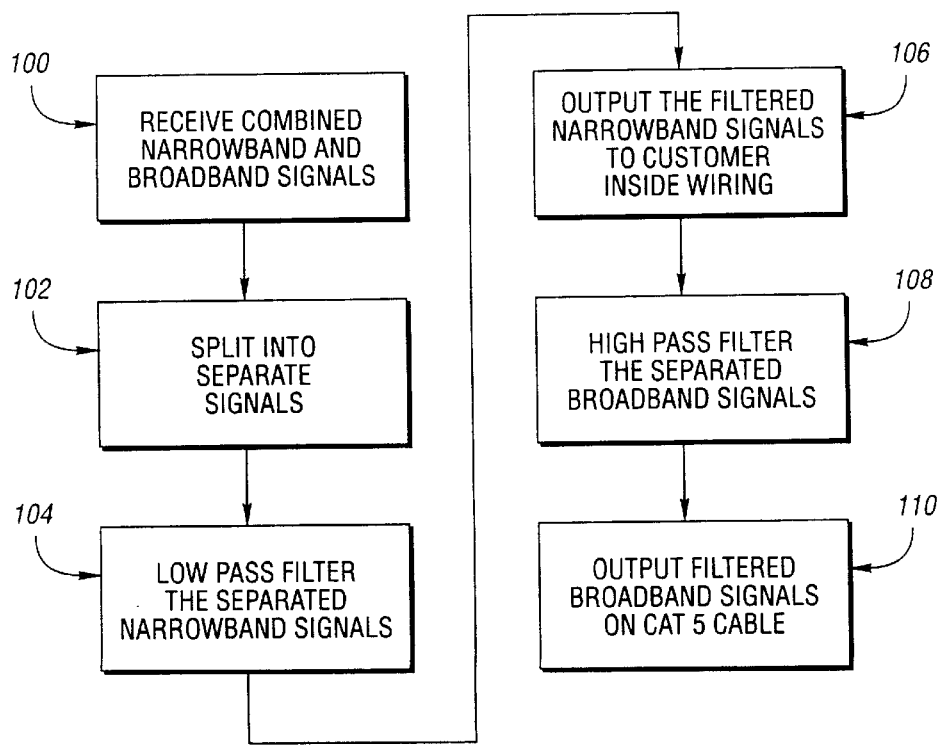
FIG. 4 is a flowchart of the overall method of interfacing a customer site to a broadband VDSL network in accordance with the present invention.

Overall operation of the present invention is illustrated in the flowchart of FIG. 4. As denoted at block 100, combined narrowband and broadband signals are received at the customer interface device via a single twisted-pair copper cable. The received signals are then split by the interface device into the separate broadband and narrowband signals at block 102. The splitting process can include signal amplification where necessary to insure the signal level output by the splitter is at a desired or minimum amplitude. At block 104, the narrowband signals output by the splitter are then low pass filtered and output at block 106 to a particular customer device (such as a telephone) via a copper pair wiring plant. As denoted at block 108, the broadband signals output by the divider are high pass filtered and output at block 110 to a particular customer broadband device, such as a television and/or a PC.

Therefore, the present invention provides a way of economically supporting combined narrowband and broadband signals on a single copper pair network cable while also improving distributed signal quality as well as reducing infiltration of EMI and radio frequency interference into the network. The present invention is therefore well suited for use in VDSL type distribution networks as well as FTTC or FTTN broadband type networks.

While the best mode for carrying out the invention has been described in detail, those familiar with the art to which this invention relates will recognize various alternative designs and embodiments for practicing the invention as defined by the following claims.

What is claimed is:

1. An interface device for connecting a customer site to a VDSL based communication network providing combined narrowband and broadband signals, the interface device comprising:
    a network port for receiving the combined narrowband and broadband signals from a single twisted-pair copper cable connected to a network device;
    a narrowband port for connection to a wiring plant located at the customer site;
    a broadband port for connection to a twisted-pair copper cable located at the customer site;
    a frequency splitter connected to the network port for separating the broadband signals for output at the broadband port and the narrowband signals for output at the narrowband port;
    a low pass filter connected between the frequency splitter and the narrowband port for filtering the separated narrowband signals before output at the narrowband port, the low pass filter being further arranged to reduce feedback of EMI and other radio interference, which is electromagnetically coupled onto the narrowband wiring plant within the customer site, from entering the network; and
    a high pass filter connected between the frequency splitter and the broadband port for filtering the separated broadband signals before output at the broadband port, the high pass filter being further arranged to reduce feedback of EMI and other radio interference, which is electromagnetically coupled onto the broadband cable within the customer site, from entering the network.

2. The device of claim 1 wherein the broadband port is connected to a Category 5 type twisted-pair copper cable.

3. The device of claim 1 wherein the narrowband port is connected to an existing telephone wiring plant at the customer site.

4. A broadband communication network for distributing combined narrowband and broadband signals comprising:
    a central office connected to at least one multi-media service provider and to a switched telephone system, the central office comprising narrowband and broadband signal encoders and decoders for combining the narrowband and broadband signals on a single network distribution line;
    a network device connected to the central office for providing a single twisted-pair copper cable drop feed to a customer site; and
    an interface device connected to a wiring plant at the customer site for receiving the combined narrowband and broadband signals from the single twisted-pair copper cable drop feed, wherein the interface device comprises:
        a frequency splitter for separating the broadband signals and narrowband signals for output on separate wiring plants located at the customer site;
        a low pass filter connected to the frequency splitter and arranged to filter the separated narrowband signals before output from the interface device as well as reduce feedback of EMI and other radio interference, which is electromagnetically coupled onto the narrowband wiring plant within the customer site, from entering the network distribution line; and
        a high pass filter connected to the frequency splitter and arranged to filter the separated broadband signals before output from the interface device as well as reduce feedback of EMI and other radio interference, which is electromagnetically coupled onto the broadband wiring plant within the customer site, from entering the network distribution line.

5. The network of claim 4 wherein the network device comprises a universal service access multiplexer.

6. The network of claim 4 wherein the separated and filtered narrowband signals are output from the interface device on a copper pair wire.

7. The network of claim 4 the separated and filtered narrowband signals are output from the interface device on an existing telephone wiring plant at the customer site.

8. The network of claim 4 wherein the separated and filtered broadband signals are output from the interface device on a twisted-pair copper cable.

9. The network of claim 4 wherein the separated and filtered broadband signals are output from the interface device on a Category 5 twisted-pair copper cable.

10. A method for interfacing a customer site to a VDSL based communication network providing combined narrowband and broadband signals on a single distribution line, the method comprising:
    receiving the combined narrowband and broadband signals at the customer site from a single twisted-pair copper drop feed;
    splitting the narrowband and broadband signals into separate output signals;

outputting low pass filtered narrowband signals to a narrowband wiring plant within the customer site;

outputting high pass filtered broadband signals to a broadband wiring plant within the customer site;

low pass filtering feedback EMI and other radio interference, which is electromagnetically coupled onto the narrowband wiring plant within the customer site, from entering the VDSL based communication network;

high pass filtering EMI and other radio interference, which is electromagnetically coupled onto the broadband wiring plant within the customer site, from entering the VDSL based communication network.

11. The method of claim 10 further comprising reducing signal interference on the separated and filtered broadband signals by outputting the signals on a twisted-pair copper cable.

* * * * *